United States Patent
Kook et al.

(10) Patent No.: US 9,546,714 B2
(45) Date of Patent: Jan. 17, 2017

(54) MULTI-STAGE TRANSMISSION FOR VEHICLE

(71) Applicant: Hyundai Motor Company, Seoul (KR)

(72) Inventors: Jae Chang Kook, Hwaseong-si (KR); Kang Soo Seo, Yongin-si (KR); Won Min Cho, Hwaseong-si (KR); Myeong Hoon Noh, Seongnam-si (KR); Seong Wook Ji, Ansan-si (KR); Wook Jin Jang, Yongin-si (KR); Seong Wook Hwang, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/937,652

(22) Filed: Nov. 10, 2015

(65) Prior Publication Data
US 2016/0356357 A1   Dec. 8, 2016

(30) Foreign Application Priority Data

Jun. 8, 2015   (KR) .......................... 10-2015-0080471

(51) Int. Cl.
*F16H 3/66*   (2006.01)
(52) U.S. Cl.
CPC ......... *F16H 3/66* (2013.01); *F16H 2200/0069* (2013.01); *F16H 2200/2012* (2013.01); *F16H 2200/2046* (2013.01)
(58) Field of Classification Search
USPC ....................................................... 475/323
See application file for complete search history.

(56) References Cited

U.S. PATENT DOCUMENTS

| | | | |
|---|---|---|---|
| 8,231,496 B2 | 7/2012 | Gumpoltsberger et al. | |
| 8,303,455 B2 | 11/2012 | Gumpoltsberger et al. | |
| 9,328,804 B1* | 5/2016 | Ji .............................. | F16H 3/66 |
| 2011/0177908 A1* | 7/2011 | Wittkopp .................. | F16H 3/66 475/271 |
| 2011/0251014 A1* | 10/2011 | Leesch ...................... | F16H 3/66 475/296 |
| 2014/0349803 A1* | 11/2014 | Takeuchi .................. | F16H 3/66 475/275 |

FOREIGN PATENT DOCUMENTS

KR   10-1509726 B1   4/2015

* cited by examiner

*Primary Examiner* — Colby M Hansen
(74) *Attorney, Agent, or Firm* — Morgan, Lewis & Bockius LLP

(57) ABSTRACT

A multi-stage transmission for a vehicle may include an input shaft, an output shaft, first to fourth planetary gear devices disposed between the input shaft and the output shaft to transmit rotary force, each of them having three rotary elements, and at least six shifting elements connected to the rotary elements of the planetary gear devices, wherein a first rotary element of the first planetary gear device is continuously connected to the input shaft and variably connected to a second rotary element of the first planetary gear device, the second rotary element is installed to be fixable by one shifting element of the at least six shifting elements, and a third rotary element of the first planetary gear device is continuously connected to a second rotary element of the second planetary gear device and variably connected to a third rotary element of the third planetary gear device.

8 Claims, 2 Drawing Sheets

FIG. 2

| Shifting stage | CL1 | CL2 | CL3 | CL4 | CL5 | CL6 | Gear ratio |
|---|---|---|---|---|---|---|---|
| 1ST |  | O | O |  | O |  | 4.441 |
| 2ND |  |  | O | O | O |  | 2.135 |
| 3RD |  |  | O |  | O | O | 1.842 |
| 4TH |  |  | O | O |  | O | 1.684 |
| 5TH |  |  |  | O | O | O | 1.448 |
| 6TH |  | O |  |  | O | O | 1.000 |
| 7TH | O |  |  |  | O | O | 0.860 |
| 8TH | O | O |  |  | O |  | 0.784 |
| 9TH | O |  |  | O | O |  | 0.714 |
| 10TH |  | O |  | O | O |  | 0.419 |
| REV |  | O | O | O |  |  | -3.200 |

MULTI-STAGE TRANSMISSION FOR VEHICLE

CROSS-REFERENCE TO RELATED APPLICATION

The present application claims priority to Korean Patent Application No. 10-2015-0080471, filed Jun. 8, 2015, the entire contents of which is incorporated herein for all purposes by this reference.

BACKGROUND OF THE INVENTION

1. Field of the Invention

The present invention generally relates to a multi-stage transmission for a vehicle and, more particularly, to a multi-stage transmission technology able to realize as many shifting stages as possible using the few parts and the simple configuration as far as possible, thereby improving fuel efficiency of a vehicle.

2. Description of Related Art

Recent rising oil prices have driven worldwide car manufacturers into unlimited competition to improve fuel efficiency. In addition, great efforts have been made to reduce the weight and improve the fuel efficiency of engines based on a variety of techniques such as downsizing.

Meanwhile, among methods that can be sought for transmissions equipped in vehicles to improve fuel efficiency, there is a method allowing an engine to operate at more efficient operation points using the multi-staging of a transmission, thereby ultimately improving the fuel efficiency.

Further, such the multi-staging of a transmission allows an engine to be operated in a relatively low revolution per minute (RPM) range, thereby further improving the quietness of a vehicle.

However, as the number of shifting stages of a transmission increases, the number of internal parts constituting the transmission also increases. This may lead to undesirable effects instead, such as the reduced mountability and transfer efficiency and the increased cost and weight of the transmission. Therefore, in order to maximize the effect of the improved fuel efficiency using the multi-staging of a transmission, it is important to devise a transmission structure able to realize maximum efficiency using a small number of parts and a relatively simple configuration.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a multi-stage transmission for a vehicle that is able to realize at least ten forward shifting stages and one reverse shifting stage with a relatively small number of parts and a simple configuration such that an engine may be operated at optimum operation points, thereby maximizing an improvement in the fuel efficiency of the vehicle, and the engine may be operated more quietly, thereby improving the quietness of the vehicle.

a multi-stage transmission for a vehicle according to the present invention may include: an input shaft; an output shaft; a first to fourth planetary gear devices disposed between the input shaft and the output shaft to transmit rotary force, each of the first to fourth planetary gear devices having three rotary elements; and at least six shifting elements connected to the rotary elements of the planetary gear devices. A first rotary element of the first planetary gear device may be permanently connected to the input shaft and variably connected to a second rotary element of the first planetary gear device, the second rotary element of the first planetary gear device may be installed to be fixable by one shifting element of the at least six shifting elements, and a third rotary element of the first planetary gear device may be permanently connected to a second rotary element of the second planetary gear device and variably connected to a third rotary element of the third planetary gear device. A first rotary element of the second planetary gear device may be permanently fixed, and a third rotary element of the second planetary gear device may be variably connected to a third rotary element of the fourth planetary gear device. A first rotary element of the third planetary gear device may be permanently connected to a first rotary element of the fourth planetary gear device, a second rotary element of the third planetary gear device may be permanently connected to the input shaft, and the third rotary element of the third planetary gear device may be variably connected to a second rotary element and the third rotary element of the fourth planetary gear device. The second rotary element of the fourth planetary gear device may be permanently connected to the output shaft.

The first planetary gear device, the second planetary gear device, the third planetary gear device and the fourth planetary gear device may be sequentially arranged along an axial direction of the input shaft and the output shaft.

The second rotary element of the first planetary gear device may be installed to be fixable to a transmission case by means of a third clutch from among the at least six shifting elements, and the other shifting elements from among the at least six shifting elements may be configured to constitute variable connection structures between the rotary elements of the planetary gear devices.

A first clutch from among the at least six shifting elements may form a variable connection structure between the first rotary element of the first planetary gear device and the second rotary element of the first planetary gear device; a second clutch from among the at least six shifting elements may form a variable connection structure between the third rotary element of the third planetary gear device and the second rotary element of the fourth planetary gear device; a fourth clutch from among the at least six shifting elements may form a variable connection structure between the third rotary element of the first planetary gear device and the third rotary element of the third planetary gear device; a fifth clutch from among the at least six shifting elements may form a variable connection structure between the third rotary element of the second planetary gear device and the third rotary element of the fourth planetary gear device; and a sixth clutch from among the at least six shifting elements may form a variable connection structure between the third rotary element of the third planetary gear device and the third rotary element of the fourth planetary gear device.

Further, a multi-stage transmission for a vehicle according to the present invention may include: a first to fourth planetary gear devices having three rotary elements, respectively; six shifting elements configured to variably provide frictional force; and a first to eighth rotary shafts connected to the rotary elements of the first to fourth planetary gear devices, wherein the first rotary shaft is an input shaft directly connected to a first rotary element of the first planetary gear device and a second rotary element of the third planetary gear device, the second rotary shaft is directly connected to a second rotary element of the first planetary gear device, the third rotary shaft is directly connected to a third rotary element of the first planetary gear device and a second rotary element of the second planetary gear device, the fourth rotary shaft is directly connected to a third rotary element of the second planetary gear device, the fifth rotary shaft is directly connected to a third rotary element of the third planetary gear device, the sixth rotary shaft is directly connected to a third rotary element of the fourth planetary gear device, the seventh rotary shaft is directly connected to a first rotary element of the third planetary gear device and a first rotary element of the fourth planetary gear device, and the eighth rotary shaft is an output shaft directly connected to a second rotary element of the fourth planetary gear device; and wherein the six shifting elements include a first to sixth clutches, the first clutch is disposed between the first rotary shaft and the second rotary shaft, the second clutch is disposed between the fifth rotary shaft and the eighth rotary shaft, the third clutch is disposed between the second rotary shaft and a transmission case, the fourth clutch is disposed between the third rotary shaft and the fifth rotary shaft, the fifth clutch is disposed between the fourth rotary shaft and the sixth rotary shaft, and the sixth clutch is disposed between the fifth rotary shaft and the sixth rotary shaft.

The first planetary gear device, the second planetary gear device, the third planetary gear device and the fourth planetary gear device may be sequentially arranged along an axial direction of the input shaft and the output shaft.

The first clutch from among the at least six shifting elements may form a variable connection structure between the first rotary element of the first planetary gear device and the second rotary element of the first planetary gear device; the second clutch from among the at least six shifting elements may form a variable connection structure between the third rotary element of the third planetary gear device and the second rotary element of the fourth planetary gear device; the fourth clutch from among the at least six shifting elements may form a variable connection structure between the third rotary element of the first planetary gear device and the third rotary element of the third planetary gear device; the fifth clutch from among the at least six shifting elements may form a variable connection structure between the third rotary element of the second planetary gear device and the third rotary element of the fourth planetary gear device; and the sixth clutch from among the at least six shifting elements may form a variable connection structure between the third rotary element of the third planetary gear device and the third rotary element of the fourth planetary gear device.

According to the present invention as set forth above, the multi-stage transmission for a vehicle can realize at least ten forward shifting stages and one reverse shifting stage with a relatively small number of parts and a simple configuration such that the engine may be operated at optimum operation points, thereby maximizing an improvement in the fuel efficiency of the vehicle, and the engine may be operated more quietly, thereby improving the quietness of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 illustrates an operation mode table of the transmission shown in FIG. 1.

Figure 1:
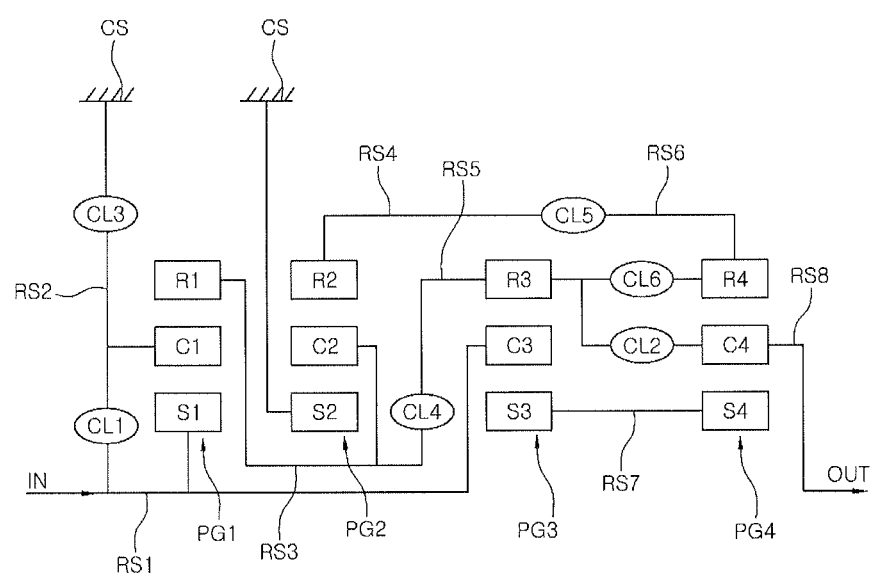
FIG. 1 is a diagram illustrating the configuration of a multi-stage transmission for a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIG. 1, a multi-stage transmission for a vehicle according to an exemplary embodiments of the present invention may include an input shaft IN, an output shaft OUT, a first to fourth planetary gear devices PG1, PG2, PG3 and PG4 disposed between the input shaft IN and the output shaft OUT to transmit rotary force, each of the first to fourth planetary gear devices PG1 to PG4 having three rotary elements, and at least six shifting elements connected to rotary elements of the first to fourth planetary gear devices PG1 to PG4.

A first rotary element S1 of the first planetary gear device PG1 may be permanently connected to the input shaft IN and variably connected to a second rotary element C1 of the first planetary gear device PG1. The second rotary element C1 of the first planetary gear device PG1 may be installed to be fixable by one shifting element of the at least six shifting elements. A third rotary element R1 of the first planetary gear device PG1 may be permanently connected to a second rotary element C2 of the second planetary gear device PG2 and variably connected to a third rotary element R3 of the third planetary gear device PG3.

A first rotary element S2 of the second planetary gear device PG2 may be permanently fixed to a transmission case CS, and a third rotary element R2 of the second planetary gear device PG2 may be variably connected to the third rotary element R4 of the fourth planetary gear device PG4.

A first rotary element S3 of the third planetary gear device PG3 may be permanently connected to a first rotary element S4 of the fourth planetary gear device PG4, a second rotary element C3 of the third planetary gear device PG3 may be permanently connected to the input shaft IN, the third rotary element R3 of the third planetary gear device PG3 may be variably connected to a second rotary element C4 of the fourth planetary gear device PG4 and the third rotary element R4 of the fourth planetary gear device PG4, and the second rotary element C4 of the fourth planetary gear device PG4 may be permanently connected to the output shaft OUT.

In the present exemplary embodiment, the first planetary gear device PG1, the second planetary gear device PG2, the third planetary gear device PG3 and the fourth planetary gear device PG4 may be sequentially arranged along the axial direction of the input shaft IN and the output shaft OUT.

The second rotary element C1 of the first planetary gear device PG1 may be installed to be fixable to the transmission case CS by a third clutch CL3 from among the at least six shifting elements.

Therefore, the third clutch CL3 functions as brake such that the second rotary element C1 of the first planetary gear device PG1 may be converted to rotatable state or restrained state not to be rotated by the operation of the third clutch CL3.

The other shifting elements from among the at least six shifting elements may be configured to constitute variable connection structures between the rotary elements of the planetary gear devices.

That is, a first clutch CL1 from among the at least six shifting elements may form a variable connection structure between the first rotary element S1 of the first planetary gear device PG1 and the second rotary element C1 of the first planetary gear device PG1. A second clutch CL2 from among the at least six shifting elements may form a variable connection structure between the third rotary element R3 of the third planetary gear device PG3 and the second rotary element C4 of the fourth planetary gear device PG4. A fourth clutch CL4 from among the at least six shifting elements may form a variable connection structure between the third rotary element R1 of the first planetary gear device PG1 and the third rotary element R3 of the third planetary gear device PG3. A fifth clutch CL5 from among the at least six shifting elements may form a variable connection structure between the third rotary element R2 of the second planetary gear device PG2 and the third rotary element R4 of the fourth planetary gear device PG4. A sixth clutch CL6 from among the at least six shifting elements may form a variable connection structure between the third rotary element R3 of the third planetary gear device PG3 and the third rotary element R4 of the fourth planetary gear device PG4.

In the present exemplary embodiment, the first rotary element S1, the second rotary element C1 and the third rotary element R1 of the first planetary gear device PG1 are a first sun gear, a first carrier and a first ring gear, respectively. The first rotary element S2, the second rotary element C2 and the third rotary element R2 of the second planetary gear device PG2 are a second sun gear, a second carrier and a second ring gear, respectively. The first rotary element S3, the second rotary element C3 and the third rotary element R3 of the third planetary gear device PG3 are a third sun gear, a third carrier and a third ring gear, respectively. The first rotary element S4, the second rotary element C4 and the third rotary element R4 of the fourth planetary gear device PG4 are a fourth sun gear, a fourth carrier and a fourth ring gear, respectively.

The multi-stage transmission for a vehicle configured as above may also be presented as follows.

Specifically, the multi-stage transmission for a vehicle according to an exemplary embodiment of the present invention may include the first to fourth planetary gear devices PG1 to PG4 each having the three rotary elements, the six shifting elements configured to variably provide frictional force, and eight rotary shafts connected to the rotary elements of the first to fourth planetary gear devices PG1 to PG4.

Hence, from among the eight rotary shafts, the first rotary shaft RS1 may be the input shaft IN directly connected to the first rotary element S1 of the first planetary gear device PG1 and the second rotary element C3 of the third planetary gear device PG3. The second rotary shaft RS2 may be directly connected to the second rotary element C1 of the first planetary gear device PG1. The third rotary shaft RS3 may be directly connected to the third rotary element R1 of the first planetary gear device PG1 and the second rotary element C2 of the second planetary gear device PG2. The fourth rotary shaft RS4 may be directly connected to the third rotary element R2 of the second planetary gear device PG2. The fifth rotary shaft RS5 may be directly connected to the third rotary element R3 of the third planetary gear device PG3. The sixth rotary shaft RS6 may be directly connected to the third rotary element R4 of the fourth planetary gear device PG4. The seventh rotary shaft RS7 may be directly connected to the first rotary element S3 of the third planetary gear device PG3 and the first rotary element S4 of the fourth planetary gear device PG4. The eighth rotary shaft RS8 may be the output shaft OUT directly connected to the second rotary element C4 of the fourth planetary gear device PG4.

As set forth above, the multi-stage transmission for a vehicle according to an exemplary embodiment of the present invention including the four simple planetary gear devices and the six shifting elements realizes ten forward shifting stages and one reverse shifting stage according to the operation mode table as illustrated in FIG. 2. Since the multi-stage shifting stages of ten shifting stages can be embodied based on a relatively small number of parts and a simple configuration, the multi-stage transmission for a vehicle can contribute to the improved fuel efficiency and quietness of a vehicle, thereby ultimately improving the marketability of the vehicle.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A multi-stage transmission for a vehicle, comprising:
   an input shaft;
   an output shaft;
   a first to fourth planetary gear devices disposed between the input shaft and the output shaft to transmit rotary force, each of the first to fourth planetary gear devices having three rotary elements; and
   at least six shifting elements connected to the rotary elements of the planetary gear devices;
   wherein a first rotary element of the first planetary gear device is continuously connected to the input shaft and variably connected to a second rotary element of the first planetary gear device, the second rotary element of the first planetary gear device is installed to be fixable by one shifting element of the at least six shifting elements, and a third rotary element of the first planetary gear device is continuously connected to a second rotary element of the second planetary gear device and variably connected to a third rotary element of the third planetary gear device;

wherein a first rotary element of the second planetary gear device is continuously fixed, and a third rotary element of the second planetary gear device is variably connected to a third rotary element of the fourth planetary gear device;

wherein a first rotary element of the third planetary gear device is continuously connected to a first rotary element of the fourth planetary gear device, a second rotary element of the third planetary gear device is continuously connected to the input shaft, and the third rotary element of the third planetary gear device is variably connected to a second rotary element and the third rotary element of the fourth planetary gear device; and wherein the second rotary element of the fourth planetary gear device is continuously connected to the output shaft.

2. The multi-stage transmission according to claim 1, wherein the first planetary gear device, the second planetary gear device, the third planetary gear device and the fourth planetary gear device are sequentially arranged along an axial direction of the input shaft and the output shaft.

3. The multi-stage transmission according to claim 2, wherein the second rotary element of the first planetary gear device is installed to be fixable to a transmission case by a third clutch from among the at least six shifting elements; and the other shifting elements from among the at least six shifting elements are configured to constitute variable connection structures between the rotary elements of the planetary gear devices.

4. The multi-stage transmission according to claim 3, wherein a first clutch from among the at least six shifting elements forms a variable connection structure between the first rotary element of the first planetary gear device and the second rotary element of the first planetary gear device;

a second clutch from among the at least six shifting elements forms a variable connection structure between the third rotary element of the third planetary gear device and the second rotary element of the fourth planetary gear device;

a fourth clutch from among the at least six shifting elements forms a variable connection structure between the third rotary element of the first planetary gear device and the third rotary element of the third planetary gear device;

a fifth clutch from among the at least six shifting elements forms a variable connection structure between the third rotary element of the second planetary gear device and the third rotary element of the fourth planetary gear device; and a sixth clutch from among the at least six shifting elements forms a variable connection structure between the third rotary element of the third planetary gear device and the third rotary element of the fourth planetary gear.

5. A multi-stage transmission for a vehicle, comprising:
a first to fourth planetary gear devices having three rotary elements, respectively;
six shifting elements configured to variably provide frictional force; and
a first to eighth rotary shafts connected to the rotary elements of the first to fourth planetary gear devices;
wherein the first rotary shaft is an input shaft directly connected to a first rotary element of the first planetary gear device and a second rotary element of the third planetary gear device, the second rotary shaft is directly connected to a second rotary element of the first planetary gear device, the third rotary shaft is directly connected to a third rotary element of the first planetary gear device and a second rotary element of the second planetary gear device, the fourth rotary shaft is directly connected to a third rotary element of the second planetary gear device, the fifth rotary shaft is directly connected to a third rotary element of the third planetary gear device, the sixth rotary shaft is directly connected to a third rotary element of the fourth planetary gear device, the seventh rotary shaft is directly connected to a first rotary element of the third planetary gear device and a first rotary element of the fourth planetary gear device, and the eighth rotary shaft is an output shaft directly connected to a second rotary element of the fourth planetary gear device; and
wherein the six shifting elements include a first to sixth clutches, the first clutch is disposed between the first rotary shaft and the second rotary shaft, the second clutch is disposed between the fifth rotary shaft and the eighth rotary shaft, the third clutch is disposed between the second rotary shaft and a transmission case, the fourth clutch is disposed between the third rotary shaft and the fifth rotary shaft, the fifth clutch is disposed between the fourth rotary shaft and the sixth rotary shaft, and the sixth clutch is disposed between the fifth rotary shaft and the sixth rotary shaft.

6. The multi-stage transmission according to claim 5, wherein the first planetary gear device, the second planetary gear device, the third planetary gear device and the fourth planetary gear device are sequentially arranged along an axial direction of the input shaft and the output shaft.

7. The multi-stage transmission according to claim 5, wherein the first clutch from among the at least six shifting elements forms a variable connection structure between the first rotary element of the first planetary gear device and the second rotary element of the first planetary gear device;

the second clutch from among the at least six shifting elements forms a variable connection structure between the third rotary element of the third planetary gear device and the second rotary element of the fourth planetary gear device;

the fourth clutch from among the at least six shifting elements forms a variable connection structure between the third rotary element of the first planetary gear device and the third rotary element of the third planetary gear device;

the fifth clutch from among the at least six shifting elements forms a variable connection structure between the third rotary element of the second planetary gear device and the third rotary element of the fourth planetary gear device; and the sixth clutch from among the at least six shifting elements forms a variable connection structure between the third rotary element of the third planetary gear device and the third rotary element of the fourth planetary gear device.

8. The multi-stage transmission according to claim 5, wherein the first rotary element of the second planetary gear device is continuously fixed to the transmission case.

* * * * *